United States Patent Office 3,429,836
Patented Feb. 25, 1969

3,429,836
FOAMED ARTICLES COMPRISING AN ALKALI METAL SILICATE AND A STYRENE RESIN
Fritz Stastny, Ludwigshafen (Rhine), Rudolf Gaeth, Limburgerhof, Pfalz, Bernhard Schmitt, Heidelberg, and Udo, Haardt, Ludwigshafen (Rhine), Germany, assignors to Badische Anilin- & Soda-Fabrik Aktiengesellschaft, Ludwigshafen (Rhine), Germany
No Drawing. Filed Dec. 29, 1964, Ser. No. 422,032
Claims priority, application Germany, Jan. 2, 1964,
B 74,874; Apr. 2, 1964, B 76,156
U.S. Cl. 260—2.5                              5 Claims
Int. Cl. C08f 47/08, 45/04

ABSTRACT OF THE DISCLOSURE

Heat-resistant organic foam plastics prepared by introducing into aqueous solutions of alkali metal silicates having particles of water-containing alkali metal silicate suspended therein (1) substances which react with the dissolved silicates with the precipitation of insoluble silicates, and (2) expandable plastic particles, and then foaming these mixtures at temperatures above the softening point of the expandable plastic particles to form a homogeneous foam article.

---

The present invention relates to a thermal insulating material and especially to a process for its production.

Foam plastics are distinguished by low density and they are therefore very well suited as thermal insulating material.

Foam thermoplastics have recently found extensive use. Thes materials, however, often have the property of being readily flammable. It is known that they may be rendered flame-retardant or self-extinguishing by additives but this does not remove the disadvantage that they have dimensional stability only up to a relatively low temperature. Thus these materials begin to sinter or melt at temperatures of about 100° to 250° C. and thus to lose their capacity to perform their regular functions. If they are contained in laminates there is the disadvantage that they may melt and possibly ignite and may thus themselves contribute to the spread of a fire.

Foam plastics are also known consisting of purely inorganic materials. These include particularly the materials obtained by heating solid sodium silicate containing water. Their production is, however, very expensive owing to the high temperatures which have to be used. They have the further disadvantage that they have only low mechanical strength so that they have not hitherto been used in practice.

A method for the production of building elements having low density has also become known which consists in mixing fine porous plastic particles with aqueous binders, shaping the product and allowing it to set. The binders may be the binders conventionally used in the building industry, such as cement, gypsum or mortar. Instead of these inorganic binders, it is also possible to use organic binders, as for example aqueous solutions of adhesive or curable synthetic resins, for example urea condensation products. Such building elements have found only limited use in practice because their production is relatively expensive. If inorganic binders be used, the building elements prepared therefrom have a certain heat resistance and thermal insulating action. They are however not equal to prolonged thermal stress at high temperatures, for example above 900° C., because the mechanical cohesion of the units is substantially destroyed, for example by the cement becoming friable. Another disadvantage is that these building elements have a relatively high density which should not be less than 600 kg./cubic meter if mechanical cohesion of the unit is to be ensured. It is furthermore difficult to prepare by the said method a building element in which the plastic particles are uniformly distributed.

Finally it is also know that a coating of a water-soluble alkaline earth metal silicate or aluminum silicate may be applied to the surface of expandable polystyrene particles, the coating amounting to 0.1 to 5.0% by weight of the amount of the polymer particles. The object of this measure is to produce, during expansion of the polystyrene particles in a screw extruder, a foam material whose cells have a uniform size and whose average diameter does not exceed a definite value.

It is the object of the present invention to provide a thermal insulating material which is easy to produce and which does not exhibit the above-mentioned disadvantages.

This object is achieved by insulating materials which have been prepared by introducing expandable fine plastic particles into an aqueous solution containing an alkali metal silicate which advantageously has solid water-containing alkali metal silicate suspended therein in such an amount that the ratio of the amount of added plastic particles to the amount of anhydrous substances contained in the solution or suspension is 1:9 to 9:1 and then foaming the mixture, if desired after it has been solidified at temperatures lower than the temperature at which the plastic particles will foam, to form a homogeneous foam article at a temperature higher than the softening point of the expandable plastic.

Preferred alkali metal silicates are sodium or potassium silicates in aqueous solutions having any concentration. Since it is necessary to evaporate water during the production of the foam articles according to this invention for the purpose of solidification, it is advantageous to use solutions or suspensions of the highest possible concentration which are still spreadable or pasty and whose concentration is in general from about 38° to 60° Bé. It is however possible to use suspensions of water-containing alkali silicate particles in aqueous alkali metal silicate solutions having a total water content of less 30% by weight. Furthermore it is possible to add fillers or thickening agents, for example silica gel, to increase the viscosity of the solutions containing alkali metal silicate. The viscosity of the solutions depends not only on the water content but also inter alia on the ratio of alkali metal oxide to silicon dioxide in the silicate, solutions of comparable water content being of lower viscosity when the alkali metal oxide content is higher. It is advantageous to use sodium silicate solutions having a ratio of sodium oxide to silicon dioxide of 1:1.2 to 1:3.5. It is advantageous to add to the solutions or suspensions containing alkali metal silicate substances which are able to react with the alkali metal silicates to form water-insoluble silicates. These may be particularly compounds which react so slowly with the alkali metal silicates at room temperature that the mixing of the substances at room temperature is possible without appreciable increase in viscosity. Examples of such compounds are zinc oxide, talc, asbestos flour, magnesium oxide or calcium carbonate. Mixtures of the said compounds may also be used. Substances which form mixed melts with the alkali metal silicates at elevated temperature, for example quartz powder or glass powder, may also be added. The sinter point of the alkali metal silicates is raised by about 350° C. to about 990° C. by these additives. The said substances are added to the solutions or suspensions containing alkali metal silicate in such an amount that the water-soluble alkali metal silicate is converted at least partly into insoluble silicates. Fillers, for example iron oxide, graphite and titanium dioxide, may also be added to the solutions. When solutions or suspensions which, in addition to the alkali metal silicates, contain the said additives are used for the production of the foam materials, the amount of expandable plastic particles to be added to the mixture is also advantageously such that the weight ratio of the amount of plastic particles to the whole of the anhydrous substances contained in the solution or suspension is from 1:9 to 9:1, preferably from 3:7 to 7:3. Particles of polystyrene or copolymers containing styrene, for example copolymers of styrene and acrylonitrile, acrylic acid, butadiene and the like, are particularly suitable as expandable plastic particles. Plastic particles based on vinylidene chloride are also suitable. In the production of thick layers it is advantageous to use as plastic particles, pre-expanded particlese which are capable of further expansion. The particles are pre-foamed only to such an extent that in the further expansion for the production of the foam article they will undergo an increase in volume of at least 5%. In the case of polystyrene particles which have a bulk density of 450 to 750 g./l. in the unfoamed condition, they may be pre-foamed to such an extent that their bulk density is lowered to about 20 to 30 g./l. The plastic particles may be made flame-retardant in a conventional way by adding inorganic halogen compounds or by mixing with chloroparaffin powder or antimony trioxide. The expandable particles contain expanding agents which do not dissolve the particles or which only slightly swell them, for example aliphatic hydrocarbons, such as propane, butane, pentane and the like. The plastic particles may also contain powdered expanding agents which liberate gas at elevated temperature, for example at more than 100° C., for example azodibutyrodinitrile. The seize of the unfoamed particles may be from about 0.1 to about 3 mm., advantageously from 0.3 to 1.2 mm.

Production of the foam articles may be carried out by preparing an alkali silicate solution or suspension having the highest possible concentration and mixing mechanically with it the expandable plastic particles, care being taken that the mixture formed is as uniform as possible. If substances are to be added to the alkali metal silicate which react therewith with the formation of sparingly soluble or water-insoluble silicates, these substances are introduced prior to the embedding of the plastic particles. To increase the mechanical stability of the foam article to be prepared, fibrous materials, for example glass fibers, such as glass staple fiber, metal cloth or plastic cloth, mineral fiber mats and the like may be added to the mixtures. It has furthermore been found to be advantageous to add small amounts, for example from 1 to 10%, of polyhydric alcohols, for example glycerin, or sugars, such as cane sugar and the like, to the mixtures. The foam article is more homogeneous when these additions are made.

After the mixture has been prepared, it may be solidified prior to expansion. Solidification may be carried out by heating, but the temperature should not exceed a value at which the plastic particles expand and is advantageously kept 10 to 50° C. below this point. Solidification may also be effected without heating when suspensions of fine water-containing alkali metal silicate particles have been used in aqueous solutions of alkali metal silicates where the total water content of the suspensions is relatively low. Such suspensions have the property of setting to a solid mass at room temperature in the course of a short time. To avoid too rapid a setting, which might hinder mixing, the suspensions or the waterglass solutions may be cooled.

After the optional solidification of the mixture has been carried out, the mixture is heated to a temperature at which the plastic particles expand by the boiling off of the expanding agent contained therein. Heating may be effected for example by blowing on hot air, by storage in a drying cabinet, by application of a high frequency field, by irradiation with infrared radiators and the like. The mixture is heated until the desired increase in volume has taken place. The temperature during expansion is usually from 80° to 150° C. The density of the initial mixture, which may be from 1100 to 3000 g./l., is decreased to 50 to 800 g./l. in the foamed mixture, depending on the composition of the initial mixture. For further hardening, the foamed mixture may be left for a long time at elevated temperature if desired in an atmosphere containing carbon dioxide, for example air enriched in carbon dioxide. This treatment may be carried out for from one to ten days at a temperature of 70° to 90° C. depending on the thickness of the foam material.

In a modified form of the process it may be carried out by breaking up the unfoamed solidified mixture and introducing the particles into a mold which is not gastight when close, for example in such an amount that from 10 to 50% of the volume of the mold is taken up. When heated, the particles expand and cohere and fill up the remaining free space. A shaped article is thus formed whose dimensions correspond to the cavity of the mold. When the mixtures are foamed in a mold, it is not essential to solidify them previously by extracting water, but in this case the viscous plastic mixture may be foamed direct without previous solidification.

In preparing foam material continuously, the mixture may be applied to an endless band, for example by means of a nozzle, and foamed on the band by the action of heat.

Finally there is also the possibility of applying the pasty mixture to a surface which is to be protected and causing it to expand thereon by the action of heat.

In the production of thick layers, for example having a layer thickness of more than 30 mm., it is advantageous to use pre-foamed particles which are capable of further expansion at the above-mentioned temperatures. In this case more homogeneous shaped articles are obtained than when starting from particles which have not been pre-foamed. For example a mixture of plastic particles alkali metal silicate and fillers may be prepared in the manner described above and then applied in a layer from 20 to 30 mm. in thickness. When this has been heated, a foam article is obtained having a thickness of up to 60 mm.

Foam material prepared according to this invention may be provided with a protective layer, for example by applying lacquers of epoxide resins, polyamides, polyvinyl cholride or copolymers of vinylidene chloride and other polymerizable substances, to protect it from the action of moisture. The protective layer may also be produced by laminating with plastic film. Finally it is possible to apply a coat of plaster.

Foam materials prepared according to this invention, which exhibit a high compressive strength, are particularly distinguished by the fact that the skeletal inorganic substance remains even under the action of high temperatures such as occur for example in an outbreak of fire. The skeletal inorganic substance has itself a flame-retardant effect owing to its porosity, so that foam material according to this invention, for example in the form of panels and the like, may be used in building construction as flame-retardant material. Contrasted with building materials which contain cement, gypsum or lime as binders, building materials prepared according to this invention remain, even in the case of prolonged action of fire, solid and pressure-resistant after cooling and do not disintegrates into an amorphous powder as in the case of building materials having the prior art binders described above. For example the insertion of a panel of foam material according to this invention which is 3 cm. in thickness between two asbestos cement panels having a thickness of 6 cm. is sufficient to fulfill the conditions which building elements have to satisfy in the test according to DIN 4102 for enrollment in fire-resistant class F 60. The foam material, owing to its mechanical stability, may be used in the form of panels direct for the production of partitions. These panels may however also be used for covering walls or as intermediate or external layers in walls, ceiling, floors, doors and the like and may be used quite generally as insulating material.

The invention is further illustrated by the following examples.

Example 1

2,200 parts by weight of an aqueous solution of sodium silicate having a concentration of 39° Bé. and a ratio of sodium oxide to silicon dioxide of 1:3.3 is mixed with 700 parts by weight of sodium silicate powder having a water content of 18%. The particles have an average size of 0.01 mm. With mechanical stirring, 2,000 parts by weight of polystyrene particles having a diameter of 0.3 mm. (which contains 2,3-dibromopropanol phosphate as flame-retardant and 6% by weight of petroleum ether having a boiling range of 23° to 40° C. as expanding agent) is added and the mixture homogenized. The mixture, in a layer thickness of 10 mm., is exposed to the action of infrared radiation until sufficient solidification has taken place to form a relatively compact composition.

This composition is kept for 2½ hours in a heating cabinet at a temperature of 105° C. A white foam material is formed with a marked increase in volume. It has a density of 150 g./l. and may be used for a great variety of applications, particularly in building elements, as insulation for ceilings, walls, roofs, floors, warehouses, industrial buildings, pipelines, storehouses, for fruit and the like.

Example 2

3,000 parts by weight of an aqueous solution of sodium silicate having a concentration of 40° Bé. and a ratio of $NaO_2:SiO_2$ of 1:3.3 is mixed in a blade mixer at room temperature with 300 parts by weight of 30% caustic potash solution, 1,000 parts by weight of powdered calcium carbonate and 3,000 parts by weight of expandable polystyrene particles (containing 6% by weight of pentane as expanding agent and having a diameter of up to about 0.3 mm.) which contain hexabromocyclododecane as a flame-retardant, to form a viscous composition. The mixture is introduced into a metal container having a double walls which is lined with a polyethylene film.

The inner wall of the container is heated to a temperature of 105° C. by introducing steam into the space between the two walls. Thirty minutes later, cold water is passed into the space between the walls.

After cooling has taken place, a homogeneous expanded molding is obtained having a density of 250 g./l. It has high break resistance and flexural strength.

If this foam material is exposed for a long period to the flame of a bunsen burner, the plastic contained therein burns away or gasifies but there always remains behind a porous article which offers considerable resistance to the transfer of heat.

Because of this property, boards of the expanded material are suitable as thermally insulating building elements which at the same time form a fire protection.

Example 3

2,000 parts by weight of an aqueous solution of sodium silicate having a concentration of 39° Bé. and a ratio of sodium oxide to silicon dioxide of 1:2.6 is intimately mixed in a kneader with 150 parts by weight of a 30% caustic soda solution, 650 parts by weight of expandable particles of a copolymer of 90 parts by weight of monostyrene and 10 parts by weight of acrylonitrile which have an average grain diameter of 0.3 mm., 250 parts by weight of cement, 150 parts by weight of chloroparaffin powder, and 80 parts by weight of antimony trioxide at room temperature; the particles contain 6% by weight of butane as expanding agent. A viscous composition which will not flow is formed. It is introduced into an open metal container capable of being closed with a cover, the amount being such that the composition occupies about 50% of the volume of the container. The container is placed inside another container having a length and breadth in each case 10 cm. more than that of the first container and having a height such that the inner container, which rests on a metal frame so that it is 10 cm. above the bottom, is lower at the top than the outer container. Hot water at 90° to 95° C. is passed into the space between the inner and outer containers so that it flows past the bottom and side walls of the inner container. After a treatment period of twenty-five minutes, the inner container is placed in cold water for fifteen minutes. The foam article removed therefrom has a density of 800 g./l.

The material is suitable in the form of lightweight blocks for building partitions and in the form of boards for covering metal frames and supports, and in the form of ceilings and walls for the interposition of a fire-retardant intermediate layer in industrial and residential buildings.

Example 4

A mixture of 900 parts by weight of a sodium silicate solution having a concentration of 38° Bé. and a ratio of sodium oxide to silicon dioxide of 1:3.36, 90 parts by weight of 30% caustic soda solution, 50 parts by weight of cane sugar, 150 parts by weight of zinc oxide, 75 parts by weight of quartz power and 450 parts by weight of particles of afterchlorinated polyvinyl chloride containing butane as an expanding agent and being in the form of globular particles having a diameter of 0.4 mm. is fed into a screw extruder having a sheeting die.

The composition is applied continuously through the die (which is 20 cm. in length and 4 mm. in width) onto an endless metal band heated to 95° C. in a thickness of about 5 mm. and heated over a zone of 5 m. with infrared radiators so that the mixture assumes a temperature of 95° to 99° C.

A foam material about 25 mm. in thickness is formed having a density of 300 g./l. It has a very dense structure and high strength.

Example 5

45 parts by weight of expandable polystyrene particles which contain 8% of pentane as an expanding agent and which have a mean diameter of 0.5 mm. are pre-foamed under the action of steam at 100° C. so that their bulk density is lowered to 50 g./l. The particles thus pre-foamed are mixed with 100 parts by weight of sodium silicate powder having a water content of 16% by weight and a particle size of about 0.1 mm., 100 parts by weight of sodium silicate solution having a concentration of 39° Bé., 50 parts by weight of zinc oxide and 25 parts by weight of magnesium oxide. The mixture is introduced to form a layer 40 mm. in height in a container lined with a polyamide film and kept for one hour at 100° C. A foam article about 50 mm. in thickness is formed which has a uniform surface and a unitary structure. The foamed material has a density of 215 g./l.

An iron sheet having a thickness of 1 mm. is stuck onto each side of the foamed material by means of a silicate solution containing 50 parts by weight of talc per 200 parts by weight. When this sample is exposed to a flame according to the fire unit curve of DIN 4102, a temperature of about 140° C. is measured on the side away from the fire after more than sixty minutes. Such an element may therefore be enrolled in the fire-resistant class F 60 according to DIN 4102. The fire-retardant properties of the foam material may be further increased by applying asbestos cement boards to its surface instead of iron sheets.

We claim:

1. A process for the production of heat-resistant organic foam materials in combination with alkali metal silicates which comprises: (A) mixing an aqueous solution of an alkali metal silicate with (1) expandable fine plastic particles, said plastic being a member selected from the group consisting of polystyrene and copolymers of styrene with acrylonitrile, acrylic acid or butadiene, and (2) a substance selected from the group consisting of zinc oxide, talc, asbestos flour, magnesium oxide and calcium carbonate or mixtures thereof, said substance being present in an amount sufficient to convert the water-soluble alkali metal silicate into a water-insoluble silicate, the ratio of the amount of plastic particles to the amount of anhydrous substances contained in the mixture being from 1:9 to 9:1; (B) solidifying the mixture at a temperature below that at which the plastic particles will expand; and (C) heating the mixture to a temperature at which the plastic particles expand to form a homogeneous foam product.

2. A process as claimed in claim 1 wherein plastic particles which has been pre-foamed but which are capable of further expansion are added to the solutions containing alkali metal silicate.

3. A process according to claim 1 wherein the concentration of the alkali metal silicate solution is from 38 to 60° Bé.

4. A process as claimed in claim 1 wherein the mixture contains solid water-containing alkali metal silicates.

5. A process as claimed in claim 1 wherein the ratio of the amount of particles to the amount of anhydrous substances contained in the mixture is from 3:7 to 7:3.

References Cited

UNITED STATES PATENTS

| | | | |
|---|---|---|---|
| 2,787,809 | 4/1957 | Stastny | 260—2.5 |
| 2,797,201 | 6/1957 | Veatch et al. | 264—5 |
| 2,861,898 | 11/1958 | Platzer | 260—2.5 |
| 2,862,834 | 12/1958 | Hiler | 260—2.5 |
| 3,021,291 | 2/1962 | Thiessen | 260—2.5 |
| 3,309,439 | 3/1967 | Nonweiler | 260—2.5 |
| 2,664,405 | 12/1953 | Anderson et al. | 260—2.5 |
| 2,804,398 | 8/1957 | Hooks | 260—2.5 |

SAMUEL H. BLECH, *Primary Examiner.*

M. J. TULLY, *Assistant Examiner.*

U.S. Cl. X.R.

117—123; 260—41